(12) United States Patent
Linn (10) Patent No.: US 10,485,307 B2
(45) Date of Patent: Nov. 26, 2019

(54) FASTENING DEVICE AND FASTENING SYSTEM

(71) Applicant: Avaitec AB, Solna (SE)

(72) Inventor: Ulf Linn, Solna (SE)

(73) Assignee: Avaitec AB, Solna (SE)

( * ) Notice: Subject to any disclaimer, the term of this patent is extended or adjusted under 35 U.S.C. 154(b) by 0 days.

(21) Appl. No.: 16/071,788

(22) PCT Filed: Jan. 19, 2017

(86) PCT No.: PCT/SE2017/050048
§ 371 (c)(1),
(2) Date: Jul. 20, 2018

(87) PCT Pub. No.: WO2017/127014
PCT Pub. Date: Jul. 27, 2017

(65) Prior Publication Data
US 2019/0075892 A1    Mar. 14, 2019

(30) Foreign Application Priority Data
Jan. 21, 2016 (SE) ...................... 1650071

(51) Int. Cl.
*A44B 17/00* (2006.01)
*A44B 13/00* (2006.01)
(Continued)

(52) U.S. Cl.
CPC ........ *A44B 17/0035* (2013.01); *A41B 11/002* (2013.01); *A44B 13/0041* (2013.01);
(Continued)

(58) Field of Classification Search
CPC .............. A41B 11/002; A44B 13/0041; A44B 17/0023; A44B 17/0035; A44B 17/0052; A44B 17/0064; F16B 21/06
See application file for complete search history.

(56) References Cited

U.S. PATENT DOCUMENTS 3,290,749 A  *  12/1966  Cohn ................. A44B 13/0017
24/689
3,699,617 A     10/1972  Hofmeister
(Continued)

FOREIGN PATENT DOCUMENTS

FR         1165156 A      10/1958
WO   WO-2011145941 A1    11/2011

OTHER PUBLICATIONS

International Search Report for PCT/SE2017/050048 dated Apr. 24, 2017.
Written Opinion for PCT/SE2017/050048 dated Apr. 24, 2017.

*Primary Examiner* — Robert Sandy
*Assistant Examiner* — David M Upchurch
(74) *Attorney, Agent, or Firm* — Marshall, Gerstein & Borun LLP (57) ABSTRACT

A fastening device and a fastening system including two fastening devices. The fastening device includes a first part having a first engaging side and a second part having a second engaging side, and at least two sets of individual engaging members configured to engage each other. Each set of engaging members includes a hook member and a locking member. The hook member protrudes from the first engaging side and has an engagement side from which a hook protrudes. The locking member is pivotably connected to the second part and extends into a recess in the second engaging side. The recess is adapted to receive the hook member for engagement with the locking member, and the locking member is configured to pivot towards the hook member when the hook member is in engagement with the locking member and a force is applied from the hook member on the locking member.

9 Claims, 4 Drawing Sheets (51) Int. Cl.
    *A41B 11/00*     (2006.01)
    *F16B 21/06*     (2006.01)
    *F16B 5/06*     (2006.01)
    *D06F 95/00*     (2006.01)

(52) U.S. Cl.
    CPC ...... *A44B 17/0023* (2013.01); *A44B 17/0052* (2013.01); *A44B 17/0064* (2013.01); *F16B 5/0664* (2013.01); *F16B 21/06* (2013.01); *D06F 95/008* (2013.01)

(56) References Cited

U.S. PATENT DOCUMENTS

| | | | |
|---|---|---|---|
| 5,490,309 A | | 2/1996 | Velasquez et al. |
| 6,684,462 B1 | * | 2/2004 | Narula .................. A44B 11/02 24/115 R |
| D662,807 S | * | 7/2012 | Waddell ........................ D8/382 |
| 8,490,257 B2 | * | 7/2013 | Cameron ................ A44B 1/04 24/104 |
| 2007/0071575 A1 | * | 3/2007 | Rudduck ................ B62D 27/00 411/386 |
| 2007/0256280 A1 | | 11/2007 | Azan |
| 2015/0059060 A1 | | 3/2015 | Schoenbeck et al. |

* cited by examiner

FASTENING DEVICE AND FASTENING SYSTEM

TECHNICAL FIELD OF THE INVENTION

The present disclosure relates to a fastening device comprising a pair of interlocking parts, and a fastening system comprising two fastening devices that are connectable.

BACKGROUND

There exists many types of two-piece fasteners. By two-piece fastener is in the present context meant a fastening device having two parts that are attached to each other. Usually this type of fastener is used for attachment to a fabric or similar material that is placed between the two parts. One part of the fastening device is provided with a shank or similar member that can penetrate the fabric and this part is placed on one side of the fabric. The other part is provided with a member that can receive and engage with the shank and this part is located on the other side of the fabric. One common two-piece fastener is the rivet type for which a hole is made in the fabric, a shank of the first part is inserted through said hole and the shank is then riveted to the other part on the other side of the fabric. One disadvantage of this rivet fastener is that the fabric is damaged by the hole, and another disadvantage is that a special rivet tool is required for the fastening procedure. For a snap fastener button, which has two fastening devices that can be detachably connected, one riveted fastener is required for each one of the fastening devices.

Another type of two-piece fastener is described in U.S. Pat. No. 5,490,309. The first part is provided with a centrally located shank that has a pointed tip that can puncture the wall of a sock. The shank has a cylindrical shape and is provided with circular notches around its circumference. The second part is located on the other side of the wall of the sock, and it has a centrally located slot with one tongue on each side. When the shank enters between the two tongues, the engagement between the notches and the ends of the tongues prevents separation of the two parts. One of these two-piece fasteners further has a female member and is attached to a sock, and another of these two-piece fasteners has a male member and is attached to another sock, thus providing a snap fastener. The two socks can then be attached to each other by snap connection of the male and female members.

A similar fastener is also known from U.S. Pat. No. 3,699,617, and in this fastener there are two snap fasteners arranged in parallel. The fastener is used for attachment to socks and the shank is relatively thick. A similar idea is also disclosed in US 2007/0256280 and in this document there are four fastening pins distributed on the surface of one of the parts. The fastening pins have a pointed end that can penetrate a sock in order to be inserted into corresponding holes in a second fastener part located on the other side of the sock.

SUMMARY OF THE INVENTION

The invention is based on the realization that it would be advantageous to have a two-piece fastening device that would have a design that made it possible for it to be used also for fabrics with a much denser mesh than socks, without damaging the fabric, and possibly also other materials such as plastic or paper, without causing noticeable damage. At the same time any risk of detachment of the fastening device from the material should be avoided.

An object of the present disclosure is to provide an improved two-piece fastening device that has a design that will make it possible to use also for fabric materials having a dense mesh, and possibly also for other materials as mentioned above, while at the same time the two parts of the fastening device are secured to each other with improved reliability.

According to the present invention is defined a fastening device comprising a first part having a first engaging side, a second part having a second engaging side, wherein the fastening device further comprises at least two sets of individual engaging members configured to engage with each other, wherein each set of engaging members comprises a hook member and a locking member, and wherein the hook member protrudes from the first engaging side of the first part, and said hook member having an engagement side from which a hook protrudes, the locking member is pivotably connected to the second part and extends into a recess provided in the second engaging side of the second part, which recess is adapted to receive a hook member for engagement with the locking member, and the locking member is configured to pivot in a direction towards the hook member when the hook member is in engagement with the locking member and a force is applied from the hook member on the locking member.

By using at least two sets of individual engaging members having the defined features, it is possible to design the hook members with very small dimensions that will make it possible to insert the hook member into more closely meshed fabric materials than the prior art knitted socks, without damage to the material. For example it may be used for fabric material such as woven materials, and even plastic or paper materials without causing damage. The combination of the features of the hook member and the locking member will provide for a very secure interlocking of the two parts. When a pulling force is applied that tries to separate the two parts, the hook member will press down on the locking member, and due to the locking member being pivotably connected to the second part, the locking member will then pivot in a direction towards the hook member. The locking member will then be pressed towards the hook member and increase the locking effect. Also, when the locking member pivots towards the hook member, any space that is available for the hook member between the locking member and the recess wall behind the hook member will be reduced. Consequently, it will become more difficult for the hook member to be retracted from the recess. The defined features provide very secure locking of the two parts even for very small dimensions. Furthermore, the two parts of the fastening device are easy to assemble by means of pressing the hook members into the recesses, which is made by hand, and no particular tool is needed. Also, the parts are not deformed as is the case with rivets.

According to one feature, the locking member may comprise a resilient pivot portion, whereby it is pivotably and resiliently connected to the second part, and a pivoting locking portion that is directed into the recess. By providing a special pivot portion of the locking member it is possible to control the pivoting of the locking member in a more precise manner.

According to another feature, the pivoting locking portion may be directed into the recess at an angle away from a wall of the recess, at which wall the pivot portion of the locking member is connected. By biasing the pivoting locking portion in this way, the pivoting movement will be more controllable.

According to a further feature, the locking portion may be directed at an angle away from a plane D that is parallel to essentially flat parts of the second engaging side of the second part. This clarifies further that the locking portion is directed into the interior of the recess. The locking portion has a free end inside the recess.

According to another feature, the hook is provided with an abutment surface, and the locking member is provided with an abutment surface, which abutment surfaces are configured to abut against each other when the hook member is inserted into the recess in the second part, and thereby locking the first part and second part to each other. In the case either one (or both) of the first part or the second part is subjected to a pulling force in order to try and separate the parts, the abutment surfaces will provide for good transfer of the force from the locking member to the hook member, or vice versa, and the moment thereby exerted on the pivotable locking member will increase the locking force between the two parts as the locking member pivots further towards the hook member and presses the hook member. The respective abutment surface preferably comprises at least a part that is configured to be parallel to the essentially flat parts of the second engaging side of the second part. The abutment surface of the hook member is preferably formed at an essentially perpendicular angle to the general longitudinal direction of the hook member.

According to another feature, the hook member may be resilient. This will make it possible for the hook member to bend back towards the recess wall portion behind its backside, when the locking member pivots and presses the hook member sideways towards the wall. The backside of the hook member may then enter into contact with the wall and friction between the wall and the hook member will contribute to the locking function. Further, the hook member preferably protrudes at essentially a right angle to the first engaging side.

According to a further feature, the hook member may display a contact surface on a backside thereof, opposite the hook, and the recess may display a corresponding contact surface, such that when a pulling force is applied to the hook member, the contact surface on the hook member enters into contact with the contact surface of the recess. The contact surface of the recess will function as an abutment surface and stop surface for the hook member. The part of the recess wall that comprises the stop surface should be sufficiently stiff not to yield when the hook member is pressed against this stop surface.

Further, the respective contact surfaces can also function as friction surfaces and prevent that the hook member slides along this contact surface of the recess if an effort is made to separate the first and the second part of the fastening device.

Generally, it is advantageous that the hook member has a hook protruding on only on side thereof, in only one direction, while the remaining sides of the hook do not have any protruding parts. This way the hook member can be made with very small dimensions and can penetrate even dense fabrics and other materials without causing damage. The hook member may otherwise have a general cylindrical shape or a shape with a rectangular cross section. The top of the hook member may be pointed. The backside of the hook member may be essentially flat.

According to another feature, the fastening device may comprise an opening into the recess through which opening the hook member is insertable into the recess, and wherein a wall portion of the recess is slanting from said opening in a direction towards an exterior side of the second part that is opposite the second engaging side, and slanting with an increasing distance relative to an axis inside the recess, which axis is perpendicular to the second engaging side. The slanting wall portion may facilitate the insertion of the hook member into the recess. The slanting wall portion may also provide for an additional wedging effect when the locking member presses the hook member against this wall portion. In particular, the wall portion may be a wall portion facing the backside of the hook member.

According to one embodiment, the fastening device may be configured to be fastened to a fabric or a plastic material or a paper material located between the first part and the second part, and the hook member may be configured to penetrate said fabric or plastic material or paper material.

According to a further aspect of the present invention is defined a fastening system comprising a first fastening device in accordance with any one of the claims defining a fastening device, and a second fastening device in accordance with any one of the claims defining a fastening device, and the first fastening device is provided with a first connection member on an exterior side thereof configured to be connected to a second connection member provided on an exterior side of the second fastening device. Such a fastening system can be used for many applications. For example, the two parts can be connected by a snap arrangement in a conventional way. Examples of alternative embodiments of the fastening system are one fastening device configured with a hook and the other fastening device configured with an eyelet or with a bar. According to a further feature, the first connection member and the second connection member are configured for detachable connection.

Further features and advantages of the invention will also become apparent from the following detailed description of embodiments.

BRIEF DESCRIPTION OF THE DRAWINGS

A detailed description of the present invention and embodiments thereof, given as examples only, will now be made with reference to the accompanying schematic drawings, in which.

DETAILED DESCRIPTION

Figure 1:
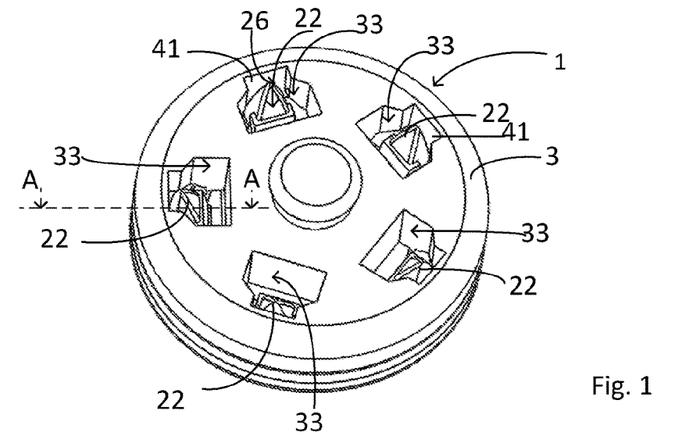
FIG. 1 shows a schematic perspective view of an embodiment of a fastening device according to the present invention.
Figure 2:
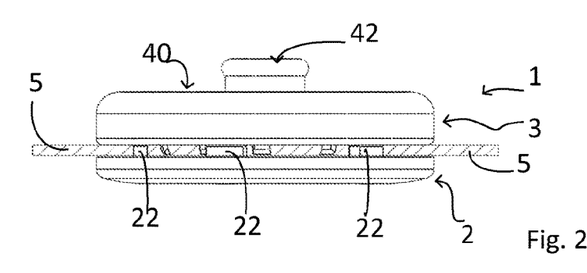
FIG. 2 shows schematically a side view of the fastening device in FIG. 1.
Figure 3A:
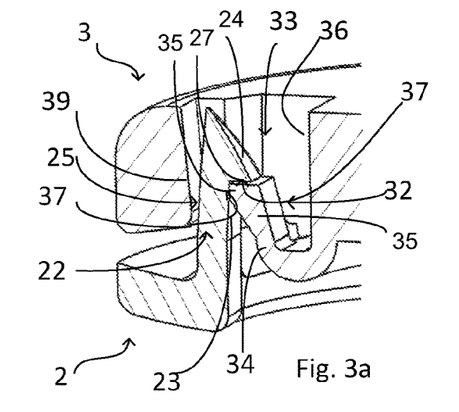
FIG. 3a shows schematically partial perspective views of a cross section along A-A of the fastening device in FIG. 1.
Figure 3B:
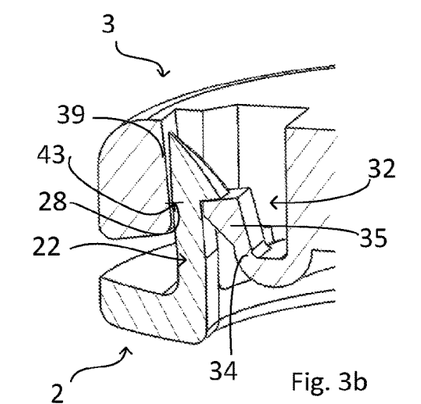
FIG. 3b is a corresponding cross section in a different position.
Figure 4A:
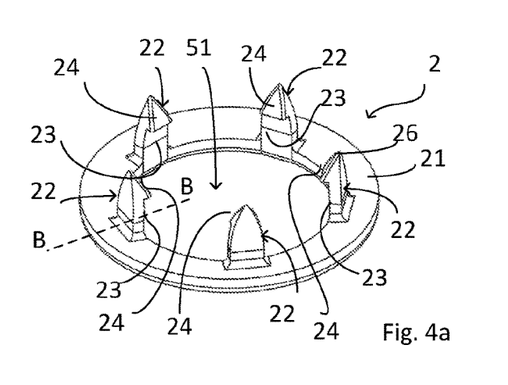
FIG. 4a shows schematically a perspective view of an embodiment of a first part of the fastening device in FIG. 1.
Figure 4B:
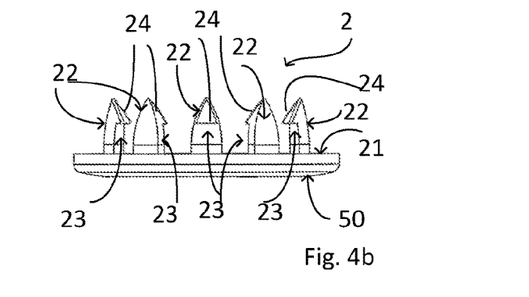
FIG. 4b shows a side view of the same first part.
Figure 4C:
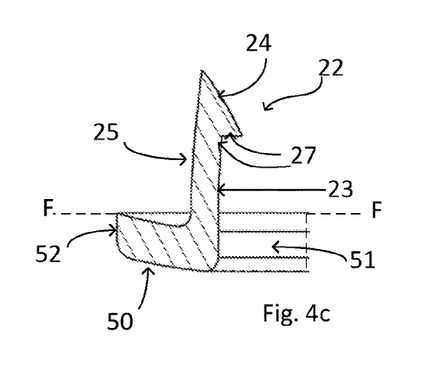
FIG. 4c shows a partial cross section of the same first part, taken along B-B in FIG. 4a, FIG. 5a shows schematically a perspective view of an embodiment of a second part of the fastening device in FIG. 1.
Figure 5A:
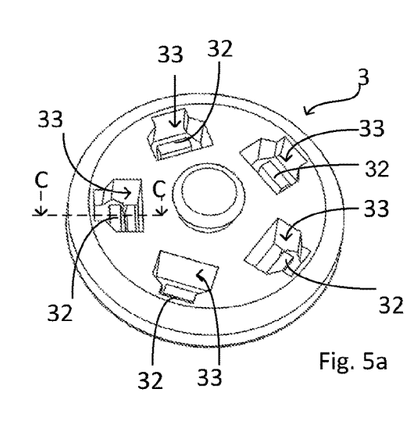
Figures 5B, 5C:
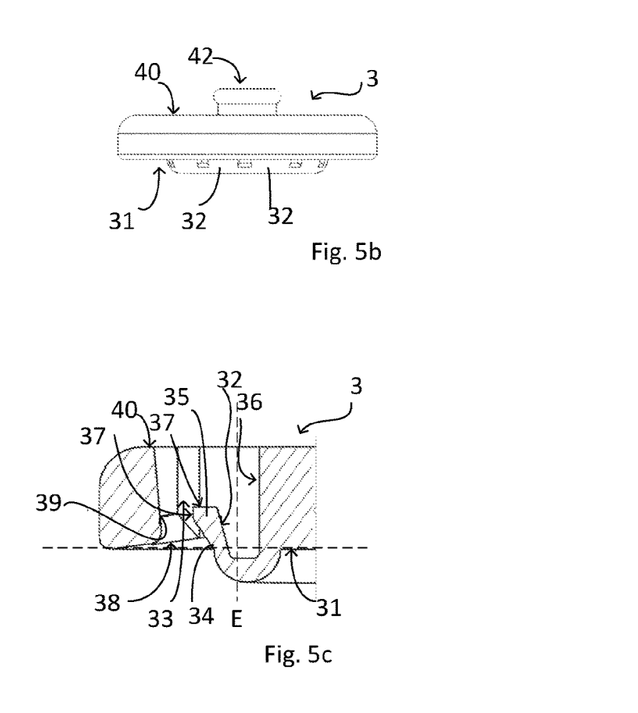
FIG. 5b shows a side view of the same second part.
FIG. 5c shows a partial cross section of the same second part, taken along C-C in FIG. 5a, FIG. 6 shows schematically an alternative embodiment of a second part of an embodiment of a fastening device.

FIGS. 1-3 illustrate an embodiment of a fastening device 1 according to the present invention. The fastening device comprises a first part 2 and a second part 3. An embodiment of the first part 2 is illustrated in more detail in FIGS. 4a-4c, and an embodiment of the second part 3 is illustrated in more detail in FIGS. 5a-5c. The first part 2 has an engaging side which in the following will be referred to as the first engaging side 21. The second part 3 has an engaging side which in the following will be referred to as the second engaging side 31. The respective engaging sides are essentially flat. When the first part is fastened to the second part, the respective engaging sides are facing each other and parallel.

The fastening device further comprises at least two sets of individual engaging members 22, 32, which are configured to engage with each other. In the illustrated embodiment, the fastening device comprises five sets of individual engaging members, but this should in no way be considered as limiting since this is only an example of an embodiment. Each set of engaging members comprises two members, a hook member 22 and a locking member 32. The hook member 22 protrudes from the first engaging side 21 of the first part 2, at essentially a perpendicular angle. The hook member has an engagement side 23 from which a hook 24 protrudes. The locking member 32 is pivotably connected to the second part 3 and extends into a recess 33 provided in the second engaging side 31 of the second part 3. The recess 33 is adapted to receive the hook member 22 for engagement with the locking member 32, see FIGS. 3a and 3b.

The locking member 32 comprises a resilient pivot portion 34, whereby it is pivotably and resiliently connected to the second part 3. The locking member 32 further comprises a locking portion 35 that extends from the pivot portion 34 and into the recess 33. In the illustrated example, the locking portion 35 is directed at an angle away from a wall 36 of the recess, at which wall the pivot portion 34 of the locking member is connected. In the illustrated example, the locking portion 35 is also directed at an angle away from a plane D that is parallel to the essentially flat parts of the second engaging side 31 of the second part, se FIG. 5c. The locking portion 35 has a free end inside the recess. The free end of the locking portion is configured to provide an abutment surface 37 for the hook 24 of the hook member 22. This abutment surface 37 comprises a surface that abuts the bottom side of the hook having a corresponding abutment surface, and it may also comprise a surface that is perpendicular thereto in order to abut the engagement side of the hook member 22 underneath the hook.

The pivot function of the pivot portion 34 can be obtained by choosing a suitable material for the locking member, and preferably the entire second part 3 is made of the same material. An example of a suitable material is some type of plastic material that can provide resiliency, e.g. a polymer such as Polyamide (PA, Nylon) and Polyoxymethylene (POM). Preferably, the pivot portion 34 can be configured as a portion of the locking member that has a smaller cross section than the rest of the locking member which can provide the resiliency that allows for a pivot function. The other parts of the second part are then essentially rigid in order to provide stability.

There is an opening part 38 of the recess located between the locking member 32 and an opposing wall portion 39 of the recess 33, i.e. a wall portion 39 opposite to the wall 36 where the locking member is connected. The hook member 22 is inserted into the recess via this opening 38, and when the hook member has been inserted, the wall portion 39 will face the backside 25 of the hook member. The recess 33 may be configured as a through-hole, as shown in the example, thus having also an opening towards the exterior side 40, i.e. the side opposite the engaging side 31, of the second part.

The hook member 22 has a general elongated shape and it has a free outer end at which a hook 24 protrudes from an engagement side 23, as already mentioned. By engagement side is here meant a side of the hook member 22 that faces the locking member 32 when the hook member is inserted into the recess 33, via the recess opening 38. The hook 24 has an abutment surface 27 formed at an essentially perpendicular angle to the general longitudinal direction of the hook member. This abutment surface 27 is configured to abut the corresponding abutment surface 37 of the locking member 32. However, also a part of the engagement side 23 immediately underneath the hook may form part of the abutment surface that abuts a corresponding part of the locking member. As previously mentioned, the hook member 22 has a backside 25, facing in the opposite direction of the hook, and facing the above described wall portion 39 of the recess. This backside is essentially flat, and it has no protruding parts in order to facilitate the insertion of the hook member into the recess 33.

The hook member 22 displays a contact surface 28 on the backside 25, opposite the hook 24, and the above described wall portion 39 of the recess 33 displays a corresponding contact surface 43. When a pulling force is applied to the hook member, the contact surface 27 on the hook member enters into contact with the contact surface 37 of the wall portion 39. The contact surface then functions as a stop surface and prevents movement of the hook in a sideways direction, i.e. in a direction essentially transverse to the wall of the recess. Generally, the wall portion 39 facing the backside 25 of the hook member 22 should be rigid and unyielding.

The first part 2 of the fastening device 1 is preferably configured with a centrally located opening 51 around which the hook members 22 are distributed, preferably symmetrically. In the illustrated embodiment in FIGS. 4a-4c, the first part 2 has a peripheral rim 52 and the first engaging side 21 is configured such that it is slanting in the direction from the peripheral rim 52 towards the opening 51. In relation to a plane F located at the intersection between the peripheral rim 52 and the engaging side 21, the engaging side 21 is slanting such that the distance from the plane F increases in the direction from the peripheral rim 52 towards the opening 51. In this way, the first part 2 will function as a cup spring when the first part 2 and the second part 3 of the fastening device are assembled. When the first part and the second part are assembled, the hook members 22 are inserted into the recesses 33 and the first part 2 and the second part 3 are pressed towards each other in order to insert the hook members sufficiently deep into the recesses to obtain engagement with the locking members. The cup spring function will then be of use for inserting the hook members 22 deeper into the recesses 33.

The first part 2 has an exterior side 50, which is the side opposite the engaging side 21, and which exterior side 50 is thus facing away from the second part 3 when the first part 2 and the second part 3 have been assembled. Also the exterior side 50 of the first part 2 may be configured such that it is slanting in the direction from the peripheral rim 52 towards the opening 51. In relation to the plane F, the engaging side 21 is slanting such that the distance from the plane F increases in the direction from the peripheral rim 52 towards the opening 51. This is also illustrated in the embodiment in FIGS. 4a-4c. In this embodiment, the first part 2 has an annular shape, but it may also have other shapes. The second part 3 of the fastening device 1 is illustrated in the embodiment as having a round shape, but it may of course also have other shapes, preferably corresponding to the shape of the first part 2.

When the first part 2 and the second part 3 of the fastening device 1 are assembled, the hook members 22 of the first part are inserted into the recesses 33 of the second part 3, via the respective openings 38. The hook 24 of the hook member will then be facing towards the locking member 32 and it will be forced past the locking portion 35 and make the locking portion pivot back towards the wall 36 at which the locking member is connected. When the hook 24 has past the locking portion 35, the locking portion will pivot back underneath the hook, and thereby prevent the hook member 22 from being retracted. The first part 2 is thereby locked to the second part 3 of the fastening device, see FIG. 3a. Further, if a pulling force is exerted on the first part with the hook member 22, the hook 24 will abut the locking member 32 via the respective abutment surfaces 27, 37 and the hook will then press the locking member downwards, towards the opening 38 into the recess. As a result of the pulling force on the hook member, the locking portion 35 will pivot towards the hook member 22 and thereby the space available for the hook member between the locking portion and the recess wall portion 39 behind the backside 25 of the hook member will be narrowed down, and the opening 38 into the recess will be made narrower, see FIG. 3b. The same will happen if a pulling force is applied on the second part 3. The more somebody will pull at either of the two parts with the intention of separating them, the more the locking portion of the locking member will be pressed towards the hook member and the more difficult it will be to separate the two parts.

The hook member may be made of a rigid material. As an alternative it may be made of a resilient material such that it will be able to bend back towards the recess wall portion 39 behind its backside 25. This material may be the same material as the locking member is made of or any of the materials given as examples above. The entire first part may be made of that same material.

According to the example of the illustrated embodiment, the wall portion 39 is configured such that it is slanting in a direction from said opening 38 towards an exterior side 40 of the second part 3, which exterior side is opposite the second engaging side 31, and slanting with an increasing distance relative to an axis E inside the recess, which axis is perpendicular to the second engaging side 31. This is purely an option, the wall and this will provide for an additional wedging effect when the locking member 32 presses the hook member 22 against this wall portion 39. It will also facilitate the insertion of the hook member into the recess.

Also optionally, the wall portion 39 behind the backside 25 of the hook member 22 may be configured to provide a guiding slot 41 for the hook member.

In one application of the present invention, the fastening device is used as a fastening device for attachment to, in particular, a fabric material or any other flexible and penetrable material. Other possible materials are plastic and paper materials. The materials should be penetrable by the hook members of the first part without causing any damage to the material. The material 5 would be placed between the first engaging side 21 of the first part 2 and the second engaging side 31 of the second part 3, and only the hook members 22 would penetrate the material, as shown schematically in FIG. 2. Preferably, the hook members would then have a pointed free end 26.

Figure 7A:
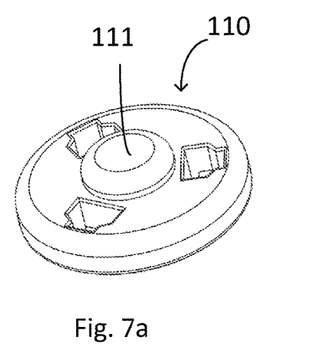
FIGS. 7a-7d illustrate schematically some application embodiments of the fastening device.
Figure 7B:
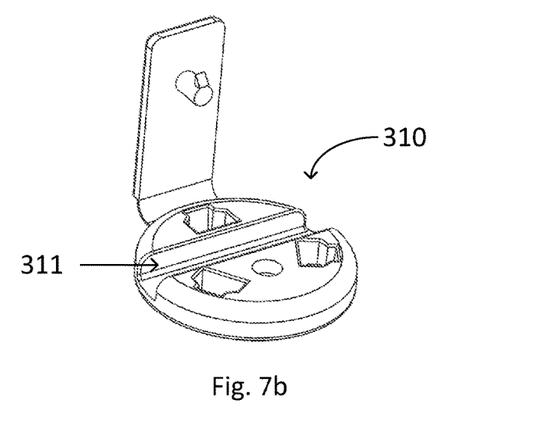
Figure 7C:
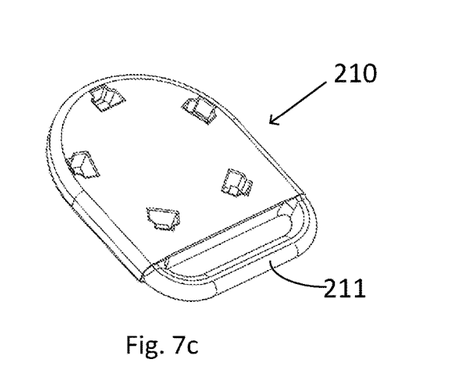
Figure 7D:
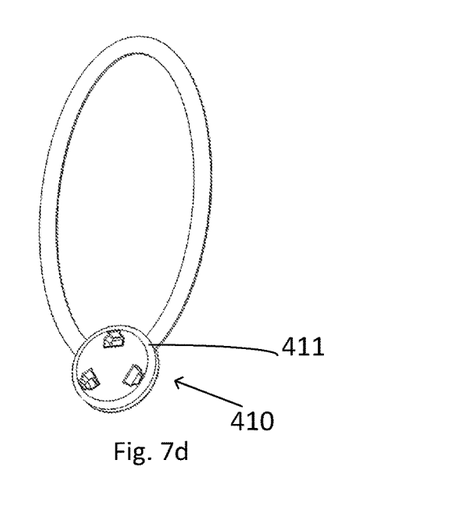

The fastening device 1 can have the first part 2 and/or the second part 3 with exterior sides 40, 50 configured in many different ways in order to serve many different purposes. Some examples are shown in FIGS. 7a-7d. The fastening device will in many cases function as some type of button that is fastened to a fabric, a plastic material, a paper material. The button 110 illustrated in FIG. 7a may e.g. be used for attaching wearable technology 111 incorporated into the button or attached to the button by some attachment means. As another application, a button 210, 310, 410 may be provided with some type of handle 211, as shown in FIG. 7c, or means for attaching a handle or similar, such as means 311, 411 for attaching a string. A means for attaching a string may be provided either on an exterior side of the fastening device, as shown in FIG. 7b or internally in the fastening device as shown in FIG. 7d. The two parts of the fastening device may also be linked to each other, permanently or temporarily, by for example a band to which, at one end thereof, one part of the fastening device is fastened and the other part is fastened at the other end.

Figure 6A:
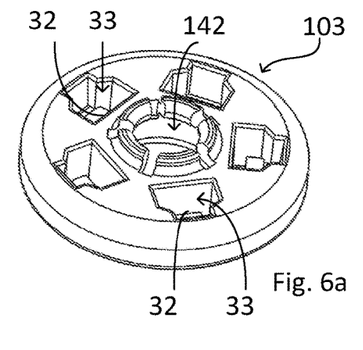
Figure 6B:
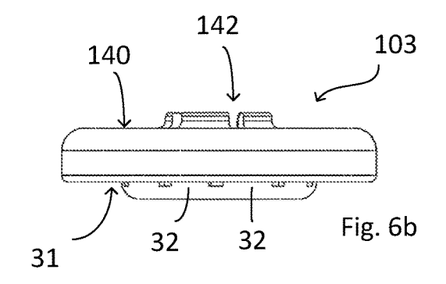
Figure 8A:
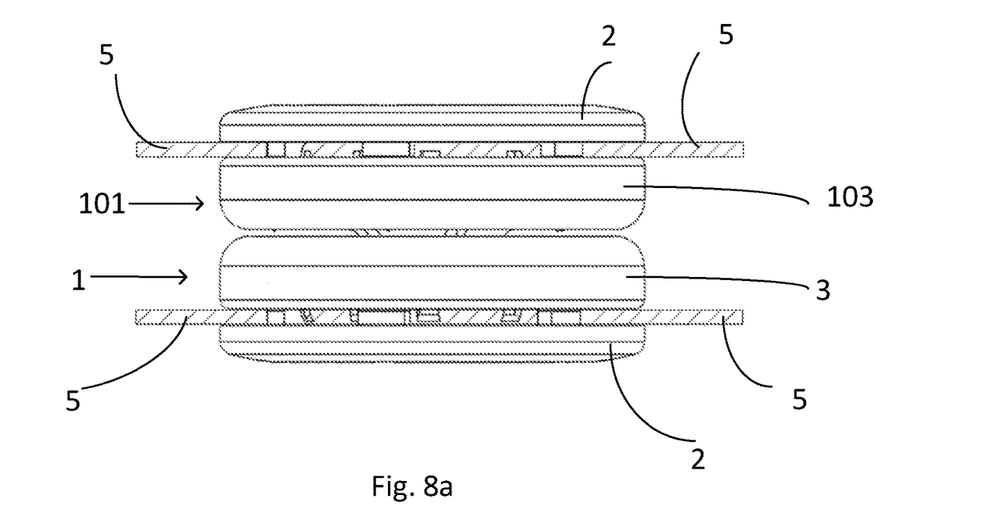
FIGS. 8a-8b show schematically embodiments of a fastening system according to the present invention.
Figure 8B:
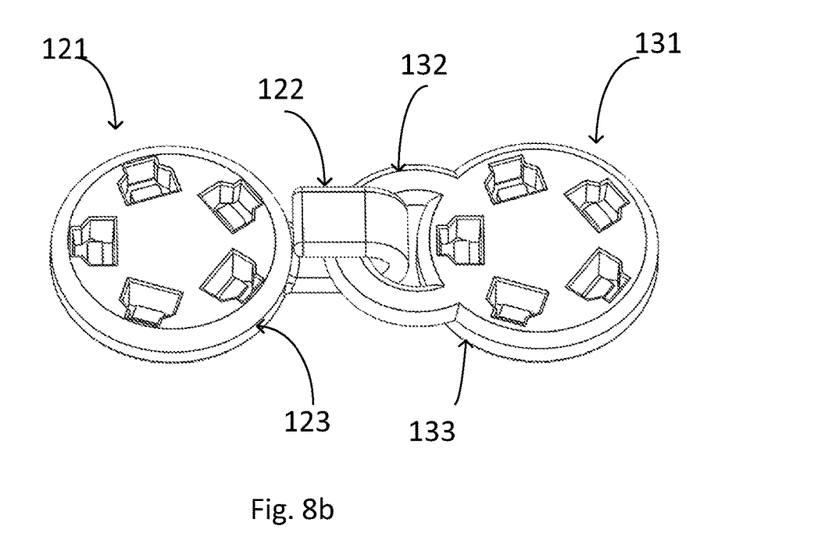

The described fastening device may also be part of a fastening system comprising a first fastening device 1 and a second fastening device 101, both configured as described above with reference to FIGS. 1-6. The two fastening devices are then provided with a respective exterior side 40, 140 configured in such a way that they may be connected to each other. As shown in the example of FIGS. 1, 2 and 5a-5c, the exterior side 40 of the second part 3 of the fastening device 1 is provided with a connection member 42 of a male shape or mushroom shape. In FIG. 6 is then illustrated an alternative embodiment of a second part 103 of a fastening device 1, which second part has an exterior side 140 provided with a connection member 142 of a female shape or a recess shape. The two parts can be connected by snapping in a conventional way. In FIG. 8a is schematically shown a fastening system comprising two fastening devices 1, 101 of the two types of FIG. 1 and FIG. 6 connected together as a snap fastener. Each one of the fastening devices 1, 101 has been fastened to a fabric 5, before being snapped together. Examples of alternative embodiments of the fastening system are one fastening device 121 configured with a connection member in the form of a hook 122 on an exterior side 123 thereof and the other fastening device 131 configured with a connection member configured as a bar or with an eyelet 132 on an exterior side 133 thereof, as shown in FIG. 8b. In both examples is provided a detachable connection between the two fastening devices.

The exterior side that is provided with the described connection members is preferably the exterior side of the second part of the fastening device, provided with the recesses and the locking members. However, there is nothing that prevents that alternatively, or even in addition, the first part of the fastening device, provided with the hook members, could be provided with connection members.

In the illustrated example, the first part 2 and the second part 3 are configured such that the hook member 22 is located externally of the locking member 32, with the hook 24 facing inwards, when the hook member has been inserted into the recess 33. However, it would be equally possible to configure the first part and the second part such that the hook member is located internally of the locking member, with the hook facing outwards, when the hook member has been inserted into the recess.

Further, in the illustrated examples, the hook member is only provided with one hook on the engaging side. However, this one hook may be configured to have several hook steps or hook levels in the longitudinal direction of the locking member, such that the distance between the first and the second part can be regulated. If, for example, the fastening device should be fastened to a fairly thick fabric and therefore the hook member cannot be inserted more than a short distance into the recess, then a hook level close to the outer end of the hook member can engage with the locking member. If the fabric is very thin, then the locking member can be inserted further into the recess and a hook level further away from the free end can be used for engagement with the lock member.

In the illustrated embodiments, the fastening device is shown as comprising five sets of individual engaging members, but this should in no way be considered as limiting since this is only an example of an embodiment. In the appended claims is defined that the fastening device should comprise at least two sets of individual engaging members. The illustrated examples can obviously be modified to include two sets, three sets, four sets, five sets or any other suitable number of sets of individual engaging members. It is foreseen that a number of at least three sets of individual engaging members can be preferred. The engaging members are with advantage evenly and/or symmetrically distributed in or on the respective parts of the fastening device. One advantageous distribution geometry is in the form of a circle.

The invention shall not be considered limited to the illustrated embodiments, but can be modified and altered in many ways, as realised by a person skilled in the art, without departing from the scope defined in the appended claims.

The invention claimed is:

1. A fastening device comprising: a first part having a first engaging side, a second part having a second engaging side, wherein the fastening device further comprises at least two sets of individual engaging members configured to engage with each other, wherein each set of engaging members comprises a hook member and a locking member, wherein the hook member protrudes from the first engaging side of the first part, said hook member having an engagement side from which a hook protrudes, wherein the locking member is pivotably connected to the second part and extends into a recess provided in the second engaging side of the second part, the recess adapted to receive the hook member for engagement with the locking member, and the locking member configured to pivot in a direction towards the hook member when the hook member is in engagement with the locking member and a force is applied from the hook member on the locking member, and wherein the fastening device is configured to be fastened to a fabric, a plastic material, or a paper material located between the first part and the second part, and whereby the hook member is configured to penetrate said fabric, plastic material, or paper material.

2. The fastening device according to claim 1, wherein the locking member comprises a resilient pivot portion, whereby it is pivotably and resiliently connected to the second part, and a pivoting locking portion that is directed into the recess at an angle away from a wall of the recess, wherein the pivot portion of the locking member is connected to said wall.

3. The fastening device according to claim 2, wherein the locking portion is directed at an angle away from a plane that is parallel to essentially flat parts of the second engaging side of the second part.

4. The fastening device according to claim 1, wherein the hook is provided with an abutment surface, and the locking member is provided with an abutment surface, which abutment surfaces are configured to abut against each other when the hook member is inserted into the recess in the second part, and thereby locking the first part and second part to each other.

5. The fastening device according to claim 1, wherein hook member is resilient.

6. The fastening device according to claim 1, wherein the hook member comprises a backside opposite the engagement side from which the hook protrudes, wherein the backside displays a contact surface, and wherein the recess displays a corresponding contact surface, such that when a pulling force is applied to the hook member, the contact surface on the hook member enters into contact with the contact surface of the recess.

7. The fastening device according to claim 1, further comprising an opening into the recess through which opening the hook member is insertable into the recess, and wherein a wall portion of the recess is slanting from said opening in a direction towards an exterior side of the second part that is opposite the second engaging side, and slanting with an increasing distance relative to an axis inside the recess, which axis is perpendicular to the second engaging side.

8. A fastening system comprising a first fastening device in accordance with claim 1, and a second fastening device in accordance with claim 1, wherein said first fastening device is provided with a first connection member on an exterior side thereof configured to be connected to a second connection member provided on an exterior side of the second fastening device.

9. The fastening system according to claim 8, wherein the first connection member and the second connection member are configured for detachable connection.

* * * * *